United States Patent [19]

Swanstrom et al.

[11] Patent Number: 5,253,597
[45] Date of Patent: Oct. 19, 1993

[54] PROCESS FOR SEPARATING ORGANIC CONTAMINANTS FROM CONTAMINATED SOILS AND SLUDGES

[75] Inventors: Carl P. Swanstrom, Naperville; Peter G. Romzick, Homewood; Carl R. Palmer, Geneva, all of Ill.

[73] Assignee: Chemical Waste Management, Inc., Oak Brook, Ill.

[21] Appl. No.: 900,281

[22] Filed: Jun. 18, 1992

[51] Int. Cl.⁵ ............................................. F23G 5/02
[52] U.S. Cl. .................................. 110/346; 47/1.42; 432/205; 110/226; 110/228
[58] Field of Search ............... 110/226, 229, 346, 228; 47/1.42; 34/12, 15, 19, 36; 432/205

[56] References Cited

U.S. PATENT DOCUMENTS

| | | | |
|---|---|---|---|
| 4,696,283 | 8/1986 | Des Ormeaux et al. | 110/250 |
| 4,738,206 | 4/1988 | Noland | 110/346 |
| 4,782,625 | 11/1988 | Gerken et al. | 46/1.42 |
| 4,951,417 | 8/1990 | Gerken et al. | 47/1.42 |
| 4,977,839 | 12/1990 | Fochtman et al. | 110/346 |
| 5,117,771 | 6/1992 | Summers | 110/346 |
| 5,121,699 | 6/1992 | Franc | 110/246 |
| 5,123,364 | 6/1992 | Gitman et al. | 110/210 |
| 5,176,087 | 1/1993 | Noland et al. | 110/346 |
| 5,191,155 | 3/1993 | Driemel et al. | 110/346 |

FOREIGN PATENT DOCUMENTS

| | | |
|---|---|---|
| 0155022 | 9/1985 | European Pat. Off. |
| 3216771 | 12/1988 | Fed. Rep. of Germany |
| 8105677 | 12/1982 | Netherlands |

OTHER PUBLICATIONS

"Soil Aeration Pilot Study Work Plan" by Canonie Engineers, Project CH 84-130, Oct. 1985.

"Performance Assessment of Portable Infrared Incinerator" by Philip L. Daily, Shirco Infrared Systems, Inc., pp. 383-386, presented Nov. 1985.

"State-of-the-Art Remedial Action Technologies Used for the Sydney Mine Waste Disposal Site Cleanup" by Norman N. Hatch Jr., et al., Hillsborough Co. Dept. of Solid Waste, Tampa, Fla., pp. 285-290, presented Nov. 1985.

"Low Temperature Thermal Stripping of Volatile Compounds" by John W. Noland et al., Roy F. Weston, Inc., West Chester, Pa., pp. 238-242, presented Mar. 1986.

"Innovative Application of Chemical Engineering Technologies for Hazardous Waste Treatment" by Robert D. Allan et al., IT Corporation, Knoxville, Tenn., pp. 98-101, presented Mar. 1986.

Primary Examiner—Henry C. Yuen
Attorney, Agent, or Firm—Allegretti & Witcoff, Ltd.

[57] ABSTRACT

A method for economically separating chemical contaminants such as volatile and semivolatile organic chemicals and polychlorinated biphenyls (PCBs), even if the contaminants are present at low concentrations, from inert materials such as soils or sludges is disclosed. The process comprises subjecting inert materials contaminated with chemical compounds to vacuum at a temperature effective to volatilize the contaminants but below incineration temperature, while continuously removing the evolved vapors, for a period of time sufficient to effect the desired degree of separation of contaminants. The evolved vapors may be collected and condensed for off-site disposal.

13 Claims, 1 Drawing Sheet

PROCESS FOR SEPARATING ORGANIC CONTAMINANTS FROM CONTAMINATED SOILS AND SLUDGES

FIELD OF THE INVENTION

This invention concerns an economical process for decontaminating soils and sludges contaminated with chemical compounds. More particularly, the invention concerns a process and apparatus for thermally separating chemical contaminants such as volatile and semivolatile organic chemicals and polychlorinated biphenyls (PCBs), even if the contaminants are present at low concentrations, from small quantities of inert materials such as soils or sludges, leaving decontaminated inert materials. The process operates batchwise under a vacuum thus allowing for an effective decontamination at a low temperature. The removed contaminants may be condensed and collected for further treatment.

BACKGROUND OF THE INVENTION

Highly halogenated organic chemicals are favored in industry due to their many useful properties, such as stability under heat and pressure. However, these chemicals are sometimes toxic to flora and fauna. Improper disposal or spills of these organic chemicals may contaminate the environment. Cleanup is necessary due to the considerable health hazard and environmental stability of these chemicals.

In the past, an acceptable procedure for cleaning up a contaminated area involved removal of the contaminated soil or material to a designated secure landfill. Due to recent and upcoming federal regulations, the types and amounts of organic materials that can be disposed of in such a designated landfill have been greatly reduced. Therefore, a growing need exists for an efficient and economical treatment process to treat soils.

The generally accepted treatment technology for destroying highly halogenated organic contaminants is incineration. Application of incineration to soil treatment is inefficient because the contaminants to be incinerated are adhered to a large mass of inert material. Particularly in treating small quantities of soil ($<5000$ cubic yards), incineration is inefficient because it involves collecting, packaging and transporting the contaminated material to a licensed incineration facility, heating the mass of inert solids to very high incineration temperatures to decompose the proportionately small amount of target contaminants, and packaging and returning the materials back to the site from where they were removed or disposing the materials in a secure landfill. In addition to the labor, transportation and energy costs, there is also a problem given that the capacity of presently licensed incineration facilities is limited.

A similar process to incineration for the disposal or cleanup of contaminated wastes is pyrolysis. Pyrolysis is conducted in a rotating dryer at operating temperatures on the order of 1,500° to 4,000° F. As with incineration, high energy costs result from the elevated temperatures.

As an alternative to incineration and pyrolysis, chemical processes were developed in order to decontaminate soil containing PCBs and chlorinated dibenzodioxins and dibenzofurans. These processes basically involve the treatment of contaminated soil with a dehalogenating agent. A typical reaction scheme involves concurrently reacting an alkali metal hydroxide with an alcohol to form an alkoxide and water; then reacting the alkoxide with the unwanted halogenated aromatic contaminant to form an ether and a salt.

In such a chemical process, the presence of water interferes with the chemical reaction scheme. Thus, the contaminated soil is preferably dried prior to the reactions. After the water has been removed, the dry, contaminated soil is treated with the reagent and the chemical reactions are carried out in a basically sealed system. To accelerate the reaction, the contaminated soil may be mixed with the reagent in an agitated vessel, possibly at an elevated temperature. The chemical treatment techniques are slow and may take weeks if not accelerated by elevated temperature, and involve the expense of spent chemicals.

Furthermore, in cases where relatively small amounts of contaminants are adsorbed to large amounts of inert materials, such as soil or sludge, each of the above techniques involves considerable expense and inconvenience. Accordingly, a keen need has been felt for a more efficient, economical system and apparatus for separating contaminants from contaminated soil, sludge and other inert materials. This need is especially evident where only small amounts (approximately 200-2,000 cubic yards) of contaminated soil or sludge need to be treated. In such situations, there is a need for a system that is adaptable to being highly transportable and cost effective.

Recently, this problem was addressed and methods to thermally decontaminate soil at temperatures below the incineration temperature were developed. Examples of these thermal treatment methods are disclosed in U.S. Pat. No. 4,997,839 (Fochtmann) and U.S. Pat. No. 4,738,206 (Noland). In these thermal processes, the contaminated soil is heated to a temperature sufficient to volatilize the contaminants which are then continuously removed from the heating chamber. Both Fochtmann and Noland disclose the fact that this process should be carried out under a slight negative pressure to avoid fugitive emissions of the volatilized contaminants. Noland also discloses that this slight negative pressure may enhance vapor stripping. However, none of the prior art known to the applicant discloses the use of a strong or high vacuum in conjunction with a thermal decontamination process as is disclosed by the current application. The instant invention utilizes a vacuum of up to about three hundred times as strong as the negative pressure disclosed in either Noland or Fochtmann. Such a high vacuum allows the process to efficiently remove contaminants at a lower temperature than processes operating just below atmospheric pressure (slight vacuum). The lower operating temperature greatly reduces energy consumption. Vent emissions are small, thus minimizing the size of air pollution control equipment. Transport of the system to the contaminated site can therefore be accomplished relatively easily.

OBJECTIVES

An object of the present invention is to provide a process and apparatus capable of simply and efficiently separating contaminants from soils and sludges. Such a system must be capable of accepting a wide variety of contaminated feed materials and economically separating the contaminants from the inert material in a closed system so that there is no release of contaminants into the atmosphere.

Another objective is to provide a thermal separation process that operates at low temperatures reducing energy requirements for treatment.

Yet another object of the present invention is to develop a process that can economically and safely treat small quantities of inert materials to a high degree without transporting the material from the site location.

Still another object is to provide a process and apparatus that is easily transportable to a treatment site, and as such able to operate independently of fixed utilities.

SUMMARY OF THE INVENTION

In a broad embodiment of the process according to the present invention, chemical contaminants are separated from inert materials such as soils and/or sludges by a transportable batchwise process. The process comprises subjecting inert materials contaminated with chemical compounds to a vacuum at a temperature effective to volatilize the contaminants but below incineration or pyrolysis temperatures, and continuously removing, collecting and condensing the evolved vapors for a period of time sufficient to effect the desired degree of decontamination of the inert material.

A method for separating chemical contaminants from contaminated soils and/or sludges comprising, in combination, the steps of:

(a) removing from the ground soil and/or sludge contaminated with volatile chemical compounds;

(b) introducing the contaminated soil and/or sludge into a batch mixing vessel;

(c) drawing a vacuum on the mixing vessel while purging the mixing vessel with an inert purge gas;

(d) agitating the contaminated soil and/or sludge in the mixing vessel in the presence of the inert gas while indirectly heating the soil and/or sludge to a temperature between about 200° to 600° F.;

(e) simultaneously with the heating and agitation of step (d) continuously drawing a vacuum until a final pressure from about 400 to about 50 mm Hg on the mixing vessel is reached while maintaining a sweep stream of an inert gas;

(f) continuously removing by means of the vacuum, evolved vapors comprising substantially all of the water and volatile chemical compounds originally contained in the contaminated soil and/or sludge; and (g) filtering and condensing a portion of the removed vapors, wherein the condensate formed comprises water and condensable organic chemical compounds.

By drawing a vacuum on the mixing vessel the temperature of the soil and/or sludge can be carefully controlled to keep the average solids temperature of the material being processed below 600° F., and for greater economy more usually below 500° F. to minimize energy consumption. The vacuum allows the system to operate with a shorter residence time than is necessary at the same temperature utilizing a weak vacuum. Once again, this minimizes energy consumption as a result of the shortened treatment time. At these temperatures and pressures, the volatile component of the contaminated material vaporizes to form a gas phase, leaving behind a decontaminated inert solid phase. The gaseous phase, which may contain fine solid particles, steam, air, an inert sweep gas, and vaporized contaminants, such as volatile and semivolatile organic compounds and PCBs, is continuously drawn off from the dryer and is subsequently filtered, condensed and collected for further treatment.

These as well as other embodiments of the present invention will become evident from the following, more detailed description of certain preferred embodiments.

BRIEF DESCRIPTION OF THE DRAWINGS

The process and apparatus in accordance with the present invention will be described with reference to the accompanying drawing, in which.

DETAILED DESCRIPTION OF THE PREFERRED EMBODIMENTS

Figure 1:
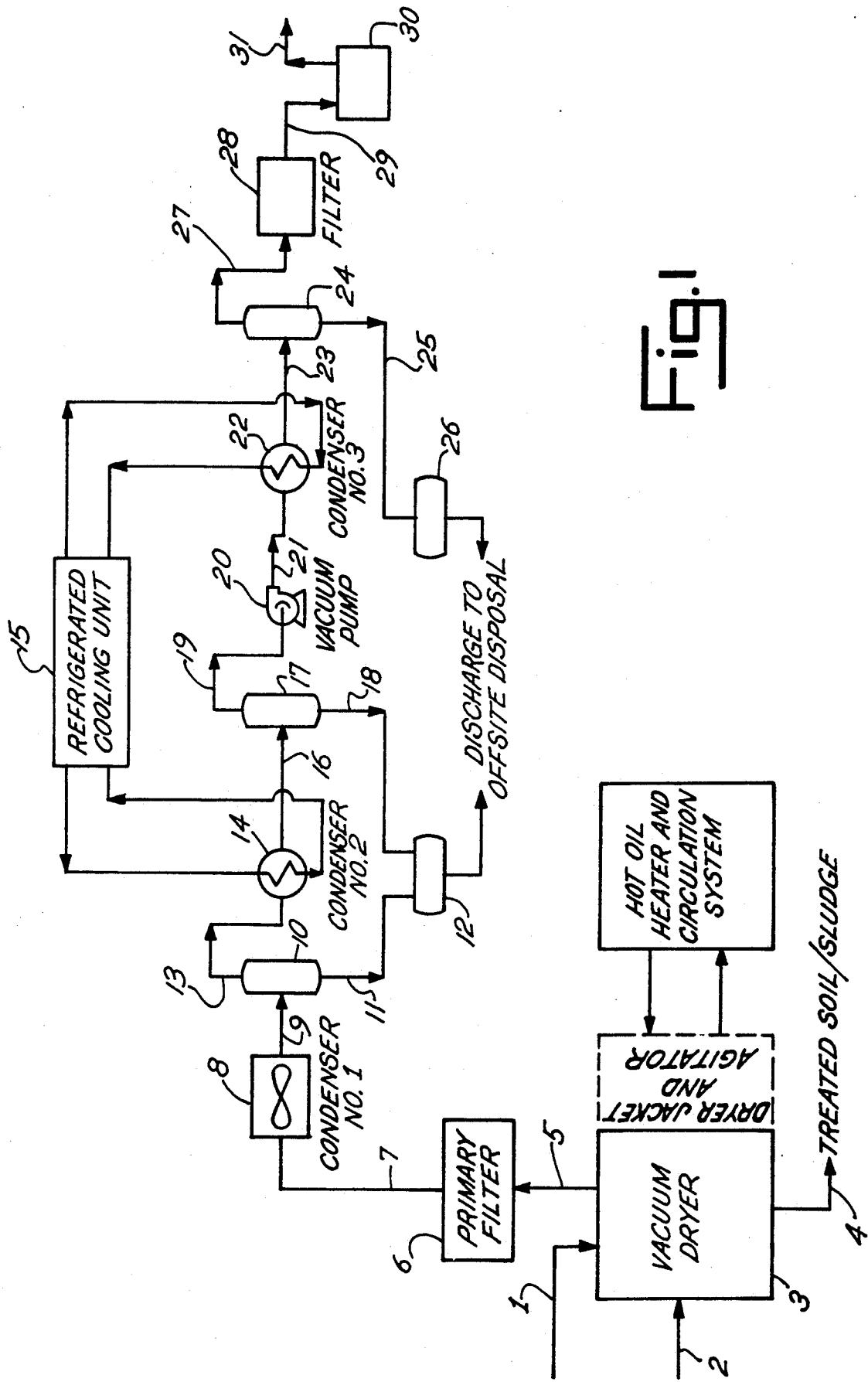
FIG. 1 is a process flow diagram of an exemplary operation.

Many types of contaminated inert materials, such as soil, sand, sludge and hazardous wastes such as contaminated pond sludges, filter cakes, etc., can successfully be treated in accordance with the present invention. The contaminated materials to be treated may collectively be referred to hereafter as "feed." The term "solids" and "feed" are used interchangeably and refer to any pumpable or non-pumpable contaminated materials comprising at least 30 wt % solids, and more preferably at least 50 wt % solids. The removal of contaminants by thermal evolution of vapor may be referred to as "thermal desorption," "distillation," "vaporization" or "drying." Contaminated feeds are obtained from a variety of sources including soil contaminated by chemical spills and industrial discharges, solids from clarifiers and thickeners, sludges from waste holding tanks and treatment ponds, and solids from filtration processes.

The process has been found to be effective for the broad variety of chemical contaminants and concentrations that are encountered in the chemical waste treatment business. As used herein, "contaminants" includes both organic and inorganic chemical compounds. While it would not be possible to list every contaminant to which the presently claimed thermal separation process may be applied, examples of contaminants that are likely to be present in the feed are polychlorinated aromatic compounds, and organic solvents. PCBs and pentachlorophenols (PCPs) are two exemplary organic compounds that may be thermally separated according to the present invention. The inventive treatment process has been shown effective in separating organic compounds whose vapor pressures (at 5° C.) ranges from 0.000001 to over 300 mm Hg. The process is capable of treating feeds with contamination levels ranging from 1 wt ppm to 20 wt % of the feed charge, with a more preferred contamination level of less than 5 wt %.

While it has been the belief of skilled workers in the art that thermal treatment of inert materials requires heating the materials to temperatures of 700° F. or higher to desorb or pyrolyze the halogenated organic contaminants, the present invention is based on the surprising discovery that it is possible at low temperatures (preferably less than 500° F.) to successfully treat a broad variety of inert materials. It is surprising that substantially complete removal of organic contaminants, including high boiling compounds, from a variety of inert materials can be effected at temperatures substantially lower than their boiling points.

The mechanism by which complex materials are dried so that substantially complete removal of contaminants from inert materials occurs is complex and not completely understood. The structure of the solids in the feed, the type of liquid contaminants and other liquids in the feed, the concentration of liquids, and the saturation of the gas phase determine the mechanism by which internal liquid flow and vaporization may occur. Fluid flow mechanisms can include (1) diffusion, (2) capillary flow, (3) flow caused by shrinkage and pressure gradients, (4) flow caused by gravity and (5) flow caused by vaporization-condensation sequence.

Drying of feeds wherein the solids are of a complex structure and texture does not occur as a single continuous process but involves a number of distinct phases. A first phase in drying contaminated inert materials involves evaporation of liquids, which may be contaminants, water, or other liquids, from the saturated surface on the solid. This is followed in turn by a period of evaporation from a saturated surface of gradually decreasing area and, finally, when the surface of the solids in the feed is no longer saturated, to a period of evaporation from the interior of the solids.

In the present batch process, the drying rate accordingly varies with temperature, vacuum level, time, solids composition, and moisture content. In a plot comparing vapor evolution versus time, distinct phases may be recognized. There is usually a first phase of gradually increasing evolution of vapors as the feed warms up. A second phase, known as the constant-rate phase, corresponds to the period in which a constant amount of vapor is evolved. The constant-rate phase continues until a point at which the rate of drying begins to fall, known as the point at which the "critical-moisture content" point is reached. After reaching the critical-moisture content point, the next phase is called the falling-rate phase. This phase is typified by a continuously changing rate throughout the remainder of the drying cycle, corresponding to the decrease in saturated surface area. A next point in the curve occurs when all of the exposed surfaces become completely unsaturated. This marks the start of the portion of the drying cycle during which the rate of internal moisture movement controls the drying rate.

Generally, the drying rate depends on factors affecting the diffusion of moisture away from the evaporating surface and those affecting the rate of internal moisture movement. Moisture which is held in the interstices of solids, or held as liquid on the surface, or is held as free moisture in cell cavities moves by gravity and capillary flow, provided that passageways for continuous flow are present. Moisture may move by vapor diffusion through the feed, provided that a temperature gradient is established by heating, thus creating a vapor-pressure gradient. Vaporization and vapor diffusion may occur in any feed in which heating takes place from one direction, drying from the other, and in which liquid is isolated between or inside granules of solid.

In the terminal phase, the drying rate is governed by the rate of internal moisture movement; the influence of external variables diminishes. This period usually predominates in determining the overall drying time to lower moisture content.

The presence of a vacuum during the heating and agitation of the contaminated soil and/or sludge material influences the efficiency and rate of evaporation of volatile chemical compounds. In addition to regulating a vacuum, the presence of a sweep of inert gas, such as nitrogen, aids in removing the volatile chemical compounds from the contaminated soil. In this way, the concentration of evolved vapors in the gas phase around the drying solids is lowered, and it becomes easier for the heated liquids to pass from the liquid phase into the vapor phase.

It is also the experience of the inventors that the presence of a small amount of water in the feed improves the effectiveness of the overall decontamination process. It is believed that as water in the interstitial spaces in the inert materials vaporizes and goes into the vapor phase, it carries contaminants along with it or otherwise facilitates the vaporization of the contaminants, i.e., by conditioning the gas phase to lower the vapor pressure at which the contaminants will pass into the vapor phase. Even though the largest portion of water present in the feed vaporizes at around the boiling point of water, some water nevertheless goes into the vapor phase together with low boiling organics, and sufficient residual water remains to be vaporized even in the feed that has been heated to a temperature above the boiling point of water, so that water is believed to play a significant role in increasing effectiveness of decontamination throughout a very broad range of temperatures.

The vaporization step of the present invention is carried out using any known vessel capable of being indirectly heated and sealed sufficiently to maintain a vacuum of at least 25 mm Hg. The vessel should also contain a means for agitating and/or mixing the contaminated soil and/or sludge material during the heating and cooling step while evolved vapors of volatile chemical compounds are removed. A preferred vessel is one that is jacketed to allow for circulation of a heated fluid, such as hot oil, and has rotating internal shafts equipped with paddles or blades for agitating and/or mixing the inert solids.

The mixing vessel used for vaporization of the feed typically operates under a vacuum. The level of vacuum is dictated by many factors, including quantity and type of feed contaminants. The actual pressure in the mixing vessel changes as a function of time during the process, and is controlled by a microprocessor. The microprocessor monitors the temperature of the system as well as the vapor evolution rate in order to determine the proper pressure level. The pressure in the system typically ranges from a high of just below atmospheric pressure when the system is first being purged to remove the oxygen, to a low of from about 400 mm Hg to about 50 mm Hg at a point when most of the water has been vaporized and it is mostly the contaminants which remain in the feed. By controlling the pressure in this fashion, it is not necessary for the system to operate at higher temperatures where energy consumption is increased. Alternatively, the system may operate at higher temperatures in which case the vacuum greatly reduces the residence time, once again lessening the energy consumption. A secondary advantage of the vacuum is that it ensures that if the system is not positively airtight, any leakage that might occur will draw air into the system, and not the reverse. This will minimize environmental emissions.

The temperature of the heating fluid in the jacketed vessel is monitored and controlled to maintain the temperature of inert solids below 600° F. Heating fluid may also be circulated through the rotating internal shafts for providing more efficient heat transfer to the contaminated soils and/or sludges. The strong vacuum and low temperature at which this process operates allows the volatile components of the contaminated material to vaporize to form a gas phase, leaving behind an inert solid phase. The gaseous phase, alternatively referred to as the evolved vapors, which may contain water vapor, air, an inert carrier gas, and vaporized contaminants such as volatile and semivolatile organic compounds and PCBs, is continuously drawn off from the dryer. The water and organics are condensed and collected for further treatment.

The specific operating parameters will vary depending on the moisture content of the feed, the concentration and boiling point(s) of contaminant(s) in the feed (which can vary over a wide range), and the percentage of the contaminants to be removed from the feed. This system may be operated to remove virtually all organic compounds and to render the treated soils and/or sludges environmentally safe by EPA standards, or to the levels determined by specific job sites and requirements. Accordingly, the temperature required to vaporize the volatile chemical compounds, the degree of vacuum needed and the residence time in the vessel may vary widely. However, the maximum average solids temperature should not exceed 600° F.

Water or steam may also be positively employed in the inventive process to help strip contaminants from the interstitial spaces. It is believed that as water volatilizes within and around the interstitial spaces it helps volatilize or strip organics, and that the flow of steam entrains and helps carry organics out the dryer in the effluent gas stream.

An inert gas other than steam is preferably introduced into the system for introductory purging of oxygen, and as a sweep gas for additional stripping efficiency. The sweep gas velocity is also controlled by the microprocessor and is also dependant upon the temperature and vapor evolution rate of the system.

The inert gas is used in the process primarily for safety to eliminate the risk of a fire in the dryer and to reduce the partial pressure of the overall atmosphere to more easily distill or boil off organic contaminants. Nitrogen is preferably used for reasons of convenience and practicality. However, other inert gases such as, but not limited to, carbon dioxide, helium and argon, could also be used subject to price considerations, availability and composition of the feed material being processed.

The gas phase, alternatively referred to as the evolved vapors, that is formed as the contaminants are removed from the contaminated soil and/or sludge in the dryer, comprises inert gases, water vapor, and volatile chemical contaminants.

The evolved vapors are removed by the vacuum and pulled through a primary filter system to remove entrained particulates. The water and organics are then condensed and discharged for off-site disposal. Condensation can be performed by any method known to the art. One method is to pass the gaseous reaction product through an economizer to utilize its latent heat to supply the heating requirements of the vaporization step. Another method involves using a refrigerated cooling system.

After treatment the solids are cooled to a temperature below 300° F. A typical batch run requires a residence time of up to eight hours. As used herein, "residence time" is defined as the time it takes to load the vessel, vaporize the contaminants, and cool and unload the vessel.

A more complete understanding of the inventive concept of this invention may be obtained by a review of the accompanying figure, which presents a preferred embodiment of the invention. The presentation of this embodiment is not intended to exclude from the scope of the inventive concept those other embodiments set out herein or other reasonable and normal modifications of the inventive concept. Details, such as miscellaneous pumps, heaters, and coolers, condensers, start-up lines, valving, and similar hardware, have been omitted as being nonessential to a clear understanding of the preferred embodiment of the invention. It will also become apparent that the apparatus and conditions may be varied widely while retaining the basic principles of the present invention. The example is to be considered illustrative, and is not in any way restrictive.

The inventive process will now be explained with reference to FIG. 1, although it will be understood that the spirit of the presently claimed invention is in no way limited to that particular embodiment.

The process equipment needed to perform the present process and which is depicted in the process flow scheme of FIG. 1 can be easily incorporated into a small mobile system that requires only minimal mobilization and demobilization activities at the site location. In a preferred embodiment, the process equipment can be contained on two semi-tractor trailers, including self-contained generators which supply all needed electrical requirements, thus eliminating the need for access to external conventional energy sources.

Referring again to FIG. 1, a batch of contaminated soil and/or sludge is loaded via line 1 into a jacketed vacuum dryer 3. Typically up to 15 tons (approximately 300 cubic feet) of contaminated soil and/or sludge material constitute a batch, and this requires about one half to about one hour to load. After the dryer is loaded and sealed, the vacuum pump 20 is started and an inert purge gas, such as nitrogen, is added to the system through line 2. Subsequently, after the system is purged, an internal agitator or other means of mixing the soil and/or sludge is started along with the circulation of a heating fluid, such as oil, through the jacketed vacuum dryer and agitator. As the vacuum pump 20 continues to draw a vacuum, nitrogen gas is added to the dryer as a sweep gas through line 2. The sweep gas helps purge the vacuum dryer 3 of volatilized liquids and aids in the stripping efficiency of the process. Both the pressure level and the sweep gas velocity are controlled by a microprocessor which monitors the temperature and vapor evolution rate of the system. The pressure in the dryer 3 typically drops to a final pressure from about 400 mm Hg to about 50 mm Hg as the water vapor is driven off to allow for operation of the dryer at temperatures below 600° F. (and preferably below 500° F.), to lower the residence time, and to prevent any environmental emissions. Both the heating and agitation rates can be computer controlled to accommodate differing feed material characteristics.

As the materials in the dryer are heated and the vacuum is applied, the contaminants will begin to vaporize. The mixture of inert sweep gas, particulates, volatilized organic materials, steam and air are continuously drawn off by the vacuum through line 5. The withdrawn vapors first pass through a primary filter system 6 which removes entrained particulates, such as soil which has been carried out of the dryer by the vapor. The vapor is then carried through line 7 to a first condenser 8. This condenser 8 is preferably a fin fan type condenser in which the vapor stream is cooled to a temperature 10° F. higher than the ambient air temperature in order to condense a portion of the hydrocarbons and water existing in the vapor phase. This stream passes via line 9 to a first knockout pot 10 where the vapor and liquid are separated. The liquid passes via line 11 to a first condensate collection tank 12. The vapor passes through line 13 to a second condenser unit 14, which is preferably a shell and tube condenser with circulating refrigerated liquid from the refrigerated cooling unit 15 on the cooling side. In this condenser, the vapor is cooled so that the temperature of the exiting stream 16 is less than 50° F. Stream 16 passes to a second knockout pot in which the liquid and vapors are separated. The liquid stream 18 feeds into the condensate collection tank 12.

The purpose of the first and second condensers 8 and 14 is to reduce the volume of vapor in line 19, which passes to the vacuum pump 20, by condensing a majority of the condensable liquids. Therefore, the size of the vacuum pump 20 can be held to a minimum thus decreasing costs significantly. As the vapor passes through the vacuum pump 20 it is compressed to atmospheric pressure, and a resulting increase in temperature also takes place. Therefore, the vapor leaving the vacuum pump 20 via line 21 is once again passed through a third condenser 22. This condenser is preferably also a shell and tube type condenser in which the circulating refrigerated liquid from the refrigerated cooling unit 15 is on the cooling side. The exiting stream 23 is cooled to about 40° F. in order to condense any remaining condensable vapors. The liquid and vapor components of stream 23 are separated in a third knockout pot 24, and the liquid stream 25 feeds into a second condensate collection tank 26. The vapor stream 27 feeds into a high effciency filter 28 to remove any remaining particulates, and the filtered stream 29 passes through an activated carbon bed 30 to remove any organic contaminants which were not condensed. After treatment, the vapor stream 31 is in condition for discharge into the atmosphere, or a portion of the stream may be recirculated back to the dryer as the sweep gas. The condensate collection tanks 12 and 26 which contain the condensed contaminants are discharged to off-site disposal.

The entire operation typically takes about four to eight hours per batch. After the treatment is complete, the dryer contents are cooled to less than 300° F., the system is returned to atmospheric pressure, and the decontaminated materials are discharged through the dryer discharge port 2. The discharged material is conveyed to a treated material stockpile which is then either returned to the excavation or properly disposed of off-site after appropriate testing and approval.

Variations on the design or operation of the above illustrative embodiments may be readily made to adapt the inventive process to various operational demands, all of which are within the scope and spirit of the present invention.

The present invention has been described in terms of certain preferred embodiments. Of course, numerous other embodiments not specifically described may fall within the spirit or scope of the following claims.

We claim as our invention:

1. A method for separating chemical contaminants from contaminated feed materials comprising, subjecting the feed materials contaminated with chemical compounds to a vacuum sufficient to expose the feed materials to a final pressure from about 400 mm Hg to about 50 mm Hg; simultaneously heating the feed materials to a temperature effective to volatilize the contaminants, but below incineration temperature and below thermal desorption temperatures required at atmospheric pressure; substantially continuously removing the evolved vapors for a period of time sufficient to effect a desired degree of separation of the contaminants from the feed materials.

2. A method as in claim 1, wherein the temperature employed to effect volatilization is equal to or below 600° F.

3. A method as in claim 1, wherein the contaminants comprise halogenated organic chemicals.

4. A method as in claim 1, further comprising passing an inert gas other than steam through the inert solids.

5. A method as in claim 4, wherein the inert gas is selected from the group consisting of nitrogen, carbon dioxide, helium and argon.

6. A method as in claim 1, wherein the concentration of any single organic contaminant in the treated feed materials after treatment is 25 ppm or less.

7. A method for separating chemical contaminants from contaminated feed materials comprising, subjecting the feed materials contaminated with chemical compounds to a vacuum sufficient to expose the feed materials to a final pressure from about 400 mm Hg to about 50 mm Hg; simultaneously heating the feed materials to a temperature effective to volatilize the contaminants, but below incineration temperature and below the thermal desorption temperature required at atmospheric pressure; substantially continuously removing the evolved vapors for a period of time sufficient to effect a desired degree of separation of the contaminants from the feed materials, wherein the evolved vapors are treated prior to atmospheric discharge.

8. A method as in claim 7, wherein the temperature employed to effect volatilization is equal to or below 600° C.

9. A method as in claim 7, wherein the contaminants comprise halogenated organic chemicals.

10. A method as in claim 7, further comprising passing an inert gas other than steam through the inert solids.

11. A method as in claim 10, wherein the inert gas is selected from the group consisting of nitrogen, carbon dioxide, helium and argon.

12. A method as in claim 7, wherein the concentration of any single organic contaminant in the treated feed materials after treatment is 25 ppm or less.

13. A method for separating chemical contaminants from contaminated inert solid material comprising, in combination, the steps of:
   (a) removing from the ground inert materials contaminated with volatile chemical compounds;
   (b) introducing the contaminated inert materials into a batch mixing vessel;
   (c) drawing a vacuum on the mixing vessel while purging the mixing vessel with an inert purge gas;
   (d) agitating the contaminated inert materials in the mixing vessel in the presence of the inert gas while indirectly heating the inert materials to a temperature between about 200° to about 600° F.;
   (e) simultaneously with the heating and agitation of step (d) continuously drawing a vacuum until a final pressure from about 400 mm Hg to about 50 mm Hg on the mixing vessel is reached while maintaining a sweep stream of an inert gas;
   (f) continuously removing by means of the vacuum, evolved vapors comprising substantially all of the volatile chemical compounds originally contained in the contaminated inert materials; and
   (g) filtering and condensing a portion of the removed vapors, wherein the condensate formed comprises volatile chemical compounds.

* * * * *